United States Patent [19]

Kistner

[11] 3,723,393

[45] Mar. 27, 1973

[54] AMIDE-TERMINATED POLYETHER PREPOLYMERS AND CURED HYDROPHILIC PRODUCTS THEREOF

[75] Inventor: John F. Kistner, Afton, Minn.

[73] Assignee: Minnesota Mining and Manufacturing Company, St. Paul, Minn.

[22] Filed: Mar. 25, 1971

[21] Appl. No.: 128,171

[52] U.S. Cl.....260/77.5 B, 204/159.11, 204/159.14, 204/159.19, 260/2 A, 260/75 NH, 260/75 NQ, 260/77.5 AM, 260/77.5 AQ
[51] Int. Cl. ............................................C08g 22/04
[58] Field of Search .260/77.5 AM, 77.5 AQ, 77.5 B, 260/75 NH, 75 NQ, 2 N, 2 A

[56] References Cited

UNITED STATES PATENTS 3,503,935   3/1970   Ziemann et al. ............. 260/77.5 B
3,424,724   1/1969   Nordstrom ................... 260/77.5 B
3,463,759   8/1969   Peters .......................... 260/75 NH
3,627,714   12/1971  Merkl .......................... 260/77.5 AM Primary Examiner—Donald E. Czaja
Assistant Examiner—M. J. Welsh
Attorney—Kinney, Alexander, Sell, Steldt & Delahunt

[57] ABSTRACT

Isocyanato- or haloformyl-terminated hydrophilic polyoxyalkylene prepolymers are reacted with certain compounds containing replaceable hydrogen atoms, such as a hydroxy-, thiol-, or amino amide, ammonia, or a primary amine, to form a hydrophilic amide-end-capped prepolymer. The latter prepolymer can be crosslinked with a crosslinking agent, such as hexamethoxymethylmelamine, under acidic conditions to provide cured or crosslinked water-insoluble hydrophilic materials useful as coatings, films, and molded or shaped articles.

19 Claims, No Drawings

AMIDE-TERMINATED POLYETHER PREPOLYMERS AND CURED HYDROPHILIC PRODUCTS THEREOF

FIELD OF INVENTION

This invention relates to polyalkylene ether prepolymers terminated with reactive amide groups, and to a method for their preparation. In another aspect, it relates to cured or crosslinked hydrophilic materials made from such prepolymers, and to methods for curing or crosslinking such prepolymers.

BACKGROUND OF THE PRIOR ART

The reaction of poly-functional alcohols, and other compounds having a plurality of active hydrogen atoms, with an excess of polyisocyanate or polyacylhalide to form liquid or low-melting prepolymers of moderate molecular weight with terminal reactive groups, e.g., —NCO or —COX (where X is used to represent the halogen atoms chlorine, bromine, and iodine), susceptible to crosslinking reaction with active hydrogen-containing compounds, is known in the art. The reaction between the terminal reactive groups of the prepolymer and the active hydrogen atoms of a crosslinking agent is generally a very fast reaction and it is common practice to keep these reactants separate and use them in the form of a two-part system. Even so, problems are often encountered in the storing and handling of the prepolymer because the —NCO and the —COX groups usually readily react with any water or moisture present, leading to undesirable side reactions. Consequently, great care must be exercised to use carefully dried containers to avoid exposure of the prepolymer to atmospheric moisture and to use dry reactants, solvents, and fillers if polyureas or polyanhydrides and gaseous by-product formations are to be avoided. This problem of the sensitivity of the prepolymer to water or moisture, or other compounds containing active hydrogen atoms, has been overcome to some extent by reacting the free —NCO or —COX groups with a blocking agent, such as phenol. When it is later desired to take advantage of the ordinary reactive nature of the reactive group, the blocked group is regenerated by the prolonged application of heat, for example, at 150° to 200° C., making it available for reaction with moisture and/or crosslinking agents containing active hydrogen atoms. This solution to the problem of the free —NCO or —COX groups has some economic disadvantages in requiring such high temperatures. Other disadvantages of this technique are often incurred due to the volatility of the blocking agent and its competition with the crosslinking agent for reaction with the —NCO and —COX groups. These problems or disadvantages are overcome in the practice of this invention.

BRIEF SUMMARY OF THE INVENTION

Briefly, isocyanato-terminated or haloformyl-terminated hydrophilic polyoxyalkylene prepolymers are reacted with at least an equivalent amount of compound having a plurality of replaceable hydrogen atoms. Some but not all of the replacable hydrogen atoms are reactive with the isocyanato or the haloformyl groups, producing an amide-endcapped prepolymer.

The term "hydrophilic polyoxyalkylene prepolymer" as used herein means a polyoxyalkylene prepolymer containing a plurality of oxyethylene units sufficient to provide a hydrophilic prepolymer and a hydrophilic polymer upon cross-linking. Such hydrophilicity will be provided by compounds containing polyoxyalkylene chains wherein all the oxyalkylene units are oxyethylene units, and also by compounds containing polyoxyalkylene chains having oxypropylene and oxyethylene units wherein at least half of the oxyalkylene units are oxyethylene units.

The abovementioned compound having a plurality of replaceable hydrogen atoms may be ammonia, a primary amine, a hydroxy-amide, a thiol-amide or an amino-amide. Each of these compounds has at least two replaceable hydrogen atoms. One of the replaceable hydrogen atoms of the compound will have a higher reactivity than the remaining replaceable hydrogen atom with the terminal isocyanato groups or the terminal haloformyl groups of the prepolymer. Therefore, the compound will attach to the terminal group of the prepolymer providing a terminal or an endcapping amide group having a replaceable terminal hydrogen which will be relatively non-reactive under the endcapping reaction conditions with the isocyanato or haloformyl moiety. The difference in reactivity of the replaceable hydrogen atoms insures against chain extension caused by the joining of two or more of the prepolymer molecules.

The amide-endcapped prepolymers require no regeneration or unblocking of reactive functional groups; they are available for crosslinking as prepared. Additionally, the prepolymers are insensitive to moisture and, in fact, may be stored in aqueous solution and crosslinked under aqueous conditions. Under such cross-linking conditions certain of the cross-linked polymers will retain a substantial amount of the water present. Utilizing this feature various soluble compounds may be incorporated into the polymers by crosslinking the polymer in an aqueous solution of the compound and evaporating the water from the cured polymer. It is possible then to slowly leach the compound from the polymer thus providing a means of controlled release of small amounts of such compounds.

The amide-endcapped prepolymers, when reacted with curing or crosslinking agents under acidic conditions, form hydrophilic water-swellable, water-insoluble, elastomeric polymers. The cured polymers of the invention, which contain hydrophilic polyoxyalkylene backbone segments having a plurality of oxyethylene units, are surprisingly hydrophilic, unlike structurally similar polymers containing polyoxyalkylene chains lacking a plurality of oxyethylene units sufficient to make the composition hydrophilic. For example, polymers containing polyoxyalkylene chains having only oxypropylene units or an insufficient amount of oxyethylene units lack the hydrophilic properties of the polymers prepared according to the present invention.

The crosslinked hydrophilic polyoxyalkylene-based polymers are water-insoluble yet capable of imbibing large quantities of water relative to their dry weight. The polymers are further characterized by being capable of undergoing reversible hydration wherein the imbibed water can easily be removed and replaced. As such the hydrophilic polymers of this invention can be used for water-swellable gaskets, filtration media, soil moisture stabilizers, humidity sensing devices, optical lenses and in other related applications.

The polymers of the invention are also oleophilic, and as such are capable of absorbing organic liquids such as benzene, acetone, chloroform, pyridene, etc. Where the organic liquid is immiscible with water it may in some cases be necessary to remove the moisture from the polymer to obtain the desired oleophilicity.

DETAILED DESCRIPTION OF THE INVENTION

Compounds used to endcap the isocyanato- or haloformyl-terminated oxyethylene-containing prepolymers, in accordance with this invention include ammonia, primary amines, hydroxyamides, thiol-amides, and amino-amides.

The amine used to endcap the isocyanato- or haloformyl-terminated oxyethylene-containing prepolymers is ammonia or a primary amine. Exemplary amines that can be used include alkylamines such as methylamine or ethylamine and aromatic amines such as aniline.

The amides used to endcap the isocyanato- or haloformyl-terminated oxyethylene-containing prepolymers, in accordance with the invention include amides having the general formula:

$$H-Q-(R_1)_n-R_2-H \qquad I$$

where Q is a divalent oxygen, a divalent sulfur, or

where $R_3$ is hydrogen or an alkyl group having from one to six carbon atoms; $R_1$ is a divalent hydrocarbyl group such as an alkylene, oxyalkylene, arylene, alkarylene, etc.; $n$ is 0 or 1; and when $n$ is 0, $R_2$ is a divalent radical having the formula

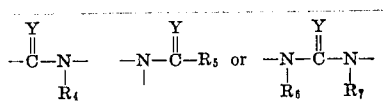

or, when $n$ is 1, $R_2$ has the formula

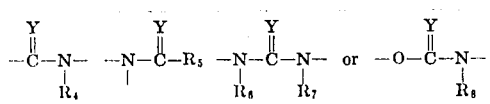

where Y is a divalent oxygen or sulfur, $R_4$, $R_5$, $R_6$, $R_7$, and $R_8$ are hydrogen, lower alkyl having from one to six carbon atoms, or phenyl, and $R_6$ and $R_7$ may be joined to provide carbon atoms to form a four to seven member ring which includes the three members provided by the

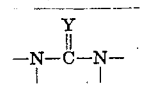

radical as shown. The amide has at least one replaceable hydrogen atom (shown as being attached to Q in Formula I) that is reactive under the endcapping reaction conditions with the reactive isocyanato or haloformyl group of the prepolymer. The amide also has at least one replaceable hydrogen atom (shown as being attached to $R_2$ in Formula I) that is relatively less reactive or is non-reactive with the reactive isocyanate or haloformyl group of the prepolymer under the endcapping reaction conditions. The latter replaceable hydrogen atom will not preferentially react with the reactive isocyanato or haloformyl groups in competition with the former replaceable hydrogen atom under the reaction conditions. The preferred amides are those where Y is oxygen and $R_1$ is an alkylene with from two to 18 carbon atoms of which at least two extend in a chain between Q and $R_2$, and Q is oxygen or $-NH-$.

Exemplary amides that may be used to endcap the isocyanato- and the haloformyl-terminated prepolymers include ω-hydroxyacylamides, e.g., glycolamide, N-methylglycolamide, N-butylglycolamide, salicylamide, 3-hydroxypropionamide, 4-hydroxybutyramide, 2-hydroxyethylcarbamate, N-methylsalicylamide, etc.; ω-aminoacylamides, e.g., 3-aminopropionamide, N-methyl-4-aminobuturamide, glycinamide, N-methylglycinamide, N-hexylglycinamide, N-N'-dimethylglycinamide; ω-thiolacylamides, e.g., thiolacetamide, γ-thiolbutyramide, γ-thiolpropionamide, and γ-thiol-N-methylbutyramide; hydroxyamides, e.g. N-hydroxyacetamide, N-hydroxythiolacetamide; substituted ureas, e.g., N-hydroxyurea, N-(2-hydroxyethyl)-N-methylurea, N-(2-hydroxyethyl)-N,N'-dimethylurea, N-(3-hydroxypropyl)-N-methylurea, N-(6-hydroxyhexyl)-urea, N-(4-hydroxycyclohexyl)-urea, N-(4-hydroxycyclohexyl)-N'-methylurea, N-(2-aminoethyl)-urea, N-(2-aminoethyl)-N-methylurea, and N-(2-methylaminoethyl)-N,N'-dimethylurea; thiolureas, e.g., N-(2-mercaptoethyl)-urea; thioureas, e.g., N-(2-hydroxyethyl)-N-methylthiourea, and N-(2-mercaptoethyl)-N,N'-dimethylthiourea; and alkyleneureas, e.g., N-hydroxyimidazolidone, N-(2-hydroxyethyl)-imidazolidone, N-(3-hydroxypropyl)imidazolidone, N-(4-hydroxybutyl)imidazolidone, N-(6-hydroxyhexyl)-imidazolidone, N-(4-hydroxycyclohexyl)imidazolidone, N-(2-hydroxyethyl-uretidinone, N-(2-hydroxyethyl)uretidinone, N-(2-hydroxyethyl)-hexahydroxyprimidinone-2, N-(2-hydroxyethyl)-hexahydro-1,3-diazaepinone-2, N-(2-methylaminoethyl)-imidazolidone, N-(2-aminoethyl)-imidazolidone, N-(3- ethylaminopropyl)-imidazolidone, N-(2-methylaminoethyl)uretidinone, Na(2-aminoethyl)hexahydropyrimidinone-2, N-(2-aminoethyl)hexahydro-1,3-diazepinone-2, N-(2-mercaptoethyl)imidazolidone, N-(2-mercaptoethyl)uretidinone, N-(2-mercaptoethyl)-hexahydropyrimidinone-2, N-(2-mercaptoethyl)-hexhydro-1,3-diazepinone-2, and the corresponding alkylene-thioureas, e.g., N-(2-hydroxyethyl)thiomidazolidone.

In reacting the —NCO and the —COX terminated, oxyethylene-containing prepolymers with an appropriate above-described compound, (i.e., ammonia, amine or amide) an equivalent amount of the latter is reacted with the prepolymer in order to insure the complete consumption of the free —NCO or —COX group. Where H—Q— in Formula I is a hydroxyl group, HO—, it reacts with the —NCO group of the prepolymer to form a carbamate linkage, —OC(O)NH—; where H—Q— is an amino group, HN(R)— (where R is hydrogen or a lower alkyl with 1-8 carbon atoms) a ureylene linkage is formed, —NRC(O)NH; where H—Q— is a mercapto group, HS—, a thiocarbamate linkage is formed, —SC(O)NH—. In the reaction of an amine with the —COX group of the haloformyl-terminated prepolymer an amide linkage is formed. In reacting the —COX terminated prepolymer with the compounds of Formula I where H—Q— is a hydroxyl group an ester linkage is formed and where H—Q— is a thiol group a thiolester is formed.

Reaction conditions can vary and will be dependent on the particular reactants used. These reactions are generally carried out under anhydrous conditions in an inert organic liquid solvent such as chloroform. The reaction is generally exothermic and carried out at temperatures sufficient to effect the end-capping of the —NCO and the —COX-terminated, oxyethylene-containing prepolymers to provide the amide end-capping group. Generally, the reaction is carried out at temperatures of 0° to 100°C., preferably 25° to 50°C. The use of a solvent will permit control of the reaction, the refluxing solvent controlling the exotherm. Following the reaction, the reaction mixture is cooled and the desired end-capped prepolymer is recovered. The reaction mixture may be filtered to remove solids, and the solvent can be removed, if desired, by stripping, for example under vacuum. Any solvent can be used, provided it is inert with respect to —NCO or —COX, whichever is being reacted, and the prepolymer and end-capped product thereof are soluble therein. Those solvents with low volatility are preferred since such solvents can be readily removed from the reaction product. The amount of solvent to be used will vary and be dependent on the exotherm of the reaction and the solubilities of the prepolymer and end-capped product. The lower the equivalent weight of the prepolymer, the higher will be the exotherm, and the greater the amount of solvent required. Generally, the solvent will be 10 to 200 weight percent or more, based on the weight of the prepolymer. It may be desired for some reactions to use no solvent. Such may be the case if the reactants are both liquids at the reaction temperature and the reaction results in a moderate or a low exotherm.

The preparation of the isocyanato-terminated and the haloformyl-terminated prepolymers used in this invention can be carried out by procedures known in the art using known materials. Generally, the isocyanato-terminated prepolymers are prepared by reacting a poly-functional material containing active hydrogen atoms, such as a polyoxyalkylene polyol or polyamine, with an organic polyisocyanate, optionally in the presence of a catalyst, such as lead octoate.

The haloformyl-terminated prepolymers are generally prepared by reacting the above-mentioned poly-functional material containing active hydrogen atoms as hereinafter described, such as polyoxyalkylene polyols, with a polyacylhalide such as phosgene or a difunctional compound represented by the general formula

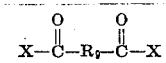

II where X is a chlorine, bromine, or iodine atom, and $R_9$ is a divalent hydrocarbyl group such as an alkylene, arylene, alkarylene, etc. having at least two carbon atoms which extend in a chain between the two carbonyl carbon atoms. The preferred polyacylhalides are those where X is chlorine and $R_9$ is an arylene group.

The poly-functional material containing active hydrogen atoms used to make the isocyanato- or haloformyl-terminated prepolymers is preferably a hydrophilic polyoxyalkylene polyol having a plurality of oxyethylene units and a hydroxyl functionality of from 2 to 6. Polyols from which the —NCO and —COX terminated prepolymers can be prepared include polyoxyethylene based polyols and diols, with molecular weights in the range of 400 to 4,000. Polyols such as this type are commercially available, e.g., that sold as "Carbowax 400" and "Carbowax 4000."

Other polyols that can be used to prepare the prepolymers used in the invention include hydrophilic polyols based upon copolymers of polyoxypropylene and polyoxyethylene. Specifically useful hydrophilic polyols of this type are the block copolymers sold as "Pluronics" such as "Pluronic" L35, F38, and P46, and the random copolymers, such as those sold as "Polyol Functional Fluid" such as WL–580, WL–660, and WL–1400. It should be noted that the ratio of oxyethylene to oxypropylene units in the abovementioned copolymers should preferably be greater than one in order to obtain the desired hydrophilic properties in the polyol and the prepolymer. Generally, the oxyethylene-containing polyols to be used will have molecular weights of at least 300 and as high as 8,000; preferably they will have molecular weights of 300 to 6,000.

The term "active hydrogen" is well-known and commonly used in the art, and as used herein means active hydrogen as measured and determined by the method described by Zerewitinoff, *J. Am. Chem. Soc.*, 49, 3181 (1927).

The aforementioned polyisocyanates which can be used are also known materials, these generally being aliphatic or aromatic polyisocyanates. For a description of these polyisocyanates see U.S. Pat. Nos. 2,716,219 and 2,948,691 and "Polyurethanes: Chemistry and Technology," by Saunders and Frisch, Part I, Interscience Pub., N.Y. (1962). Exemplary polyisocyanates that may be used include ethylene diisocyanate, propylene-1, 2-diisocyanate, butylene-1,4-diisocyanate; hexylene-1,6-diisocyanate, cyclohexylene-1,2-diisocyanate, m-phenylene diisocyanate, toluene-2,4-diisocyanate, toluene-2,6-diisocyanate, mixtures of toluene-2,4-diisocyanate and toluene-2,6-diisocyanate, diphenyl-3,3'-dimethyl-4,4'-diisocyanate, diphenyl-3,3'-dimethoxy-4,4'-diisocyanate, diphenylmethane-4,4'-diisocyanate, diphenylmethane-4,4'-dimethyl-3,8'-diisocyanate, dicyclohexylmethane-4,4'-dimethyl-3,3'-diisocyanate, 1,5-naphthalene diisocyanate, and polymethylene polyphenylene-poly-isocyanates such as "PAPI." Aromatic polyisocyanates are preferred because of their ease of reaction and of the stability of the compositions formed therefrom.

It is also within the scope of this invention to react the isocyanato-terminated and the haloformyl-terminated oxyethylene-containing prepolymers first with less than an equivalent amount of so-called chain-extending agents containing active hydrogen atoms and then with the desired compound to produce the terminated reactive amide group in order to get a higher molecular weight polymer. Typical chain-extending agents useful for this purpose include ethylene glycol, ethylene diamine, hexamethylene glycol, diethylene glycol, and the like. Following chain extension, the chain-extended prepolymer with free —NCO or —COX groups is then reacted with the replaceable hydrogen containing compound as described above.

The isocyanato-terminated oxyethylene-containing prepolymers are generally preferred over the haloformyl-terminated oxyethylene-containing prepolymers because the isocyanato-terminated prepolymers produce no undesirable by-products in the end-capping reaction such as are produced in the end-capping reaction of the haloformyl-terminated prepolymers wherein is produced hydrogen halide as a by-product.

The reaction product of the isocyanato-terminated or haloformyl-terminated hydrophilic prepolymer with the compounds as described above, i.e., ammonia, primary amines, and amides, to produce the hydrophilic amide end-capped prepolymer of the invention can be represented as follows:

$$R_{14}[(R_{15}O)_m(R_{16})[Z-(R_{17})_s-R_{18}-H]_a]_p \qquad \text{III}$$

where $R_{14}$ is the polyvalent organic moiety or residue of an organic compound having a plurality of active hydrogens equal to $p$ but devoid of such active hydrogens; $p$ is an integer from 2 to 6; $(R_{15}O)_m$ is a divalent hydrophilic polyoxyalkylene chain having a plurality of oxyethylene units as herein described; $m$ is an integer from 5 to 200 representing the number of oxyalkylene units in the chain; $R_{16}$ is the polyvalent residue of a polyisocyanate or a polyacylhalide compound having a valency of $a+1$; $a$ is an integer from 1 to 3; $R_{17}$ is a divalent hydrocarbyl group such as an alkylene, arylene, alkarylene, etc., extending in a chain between Z and $R_{18}$; $s$ is an integer having the value 0 or 1; Z is divalent oxygen, divalent sulfur, or an imino group having a substituent hydrogen or lower alkyl group such as an alkyl group having from one to six carbon atoms; $R_{18}$ is a radical having the formula

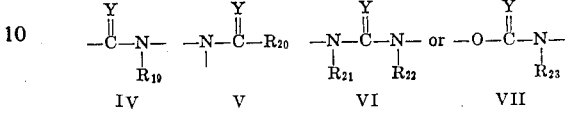

$$\text{IV} \qquad \text{V} \qquad \text{VI} \qquad \text{VII}$$

where $R_{19}, R_{20}, R_{21}, R_{22}, R_{23}$ are hydrogen, alkyl or aryl, $R_{21}$ and $R_{22}$ are separate radicals or are joined in a chain by from one to four carbon atoms to form a ring, and Y is oxygen or sulfur. The hydrogen atom shown in Formula III as being attached to the $R_{18}$ group (as well as the hydrogen atoms provided where $R_{19}, R_{22},$ and $R_{23}$ are hydrogen) are replaceable hydrogen atoms susceptible to reaction with the hereinafter described crosslinking agent under the crosslinking reaction conditions.

The amide-terminated oxyethylene-containing prepolymers are crosslinked with crosslinking agents such as an aldehyde, e.g., formaldehyde, paraldehyde, polymers of aldehydes, such as polyformaldehydes, e.g., paraformaldehyde, trioxymethylene, etc., organic compounds having a plurality of terminal alkoxy groups preferably having the general formula:

$$R_{10}(CH_2OR_{11})_b \qquad \text{VIII}$$

where $R_{11}$ is an alkyl group having from one to six carbon atoms; $b$ is an integer from 2 to 6; and $R_{10}$ is the polyvalent residue of an organic compound having a valency of $b$ and the general formula as represented by formulas X–XIII as follows:

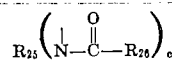

where $R_{25}$ is the polyvalent residue of an organic compound having a valency of $c$; $c$ is an integer from 2 to 4; and $R_{26}$ is hydrogen, alkyl, aryl, or alkoxymethyl; a preferred compound of this type being N,N'-dimethoxymethyl-N,N'-diacetylethylenediamine,

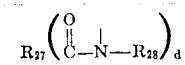

where $R_{27}$ is the polyvalent residue of an organic compound having the valency $d$; $d$ is an integer from 2 to 4; $R_{28}$ is hydrogen, alkyl, aryl, or alkoxymethyl; the preferred compounds of this type being N,N'- dimethoxymethyl-N,N'-dimethyl succinamide, and N,N'-dimethoxymethyl-N,N'-dimethyl phthalamide,

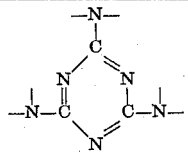   XII where $R_{29}$ and $R_{30}$ are hydrogen, alkyl, aryl, alkoxymethyl, or together provide the carbon atoms necessary to join the two nitrogen atoms in a ring having four to seven atoms therein; preferred compounds of this type being N,N'-dimethyoxymethylurea, and N,N'-dimethoxymethyl-imidazolidone-2; and

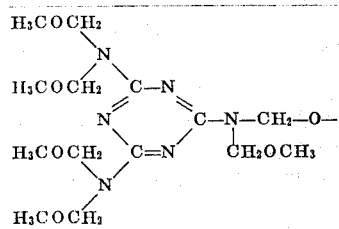   XIII the preferred compounds of this type being hexamethyoxymethylmelamine, pentamethoxymethyl-melamine, and the reaction product of ethylene glycol and hexamethoxymethylmelamine which is a mixture of oligomers, the simplest of which is 1,2-bis[2,4-bis(dimethoxymethylamino)-5-triazino-methoxymethylaminoethoxy] ethylene having the structure

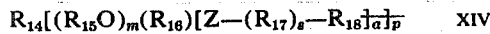

Generally, the amount of crosslinker used will be sufficient to give a ratio of equivalent weight of crosslinker to equivalent weight of amide-terminated prepolymer of from about 0.1/1 to about 2/1, preferably about 1/1. The cross-linker is preferably dissolved in the amide-terminated prepolymer and the admixture mixed with acid catalyst. Where the acid catalyst used is a free acid, immediate curing takes place. Where a latent acid catalyst is used, the admixture is relatively stable and can be molded or applied to a substrate and then activated when desired by appropriate means, e.g., heat, light, etc. depending upon the particular latent catalyst used.

The cured hydrophilic polymer is a crosslinked structure. The crosslinked, hydrophilic polymer comprises crosslinked backbone segments having the formula $$R_{14}[(R_{15}O)_m(R_{16})[Z-(R_{17})_s-R_{18}]_a]_p \quad XIV$$

(where $R_{14}$, $R_{15}$, $R_{16}$, Z, $R_{17}$, $R_{18}$, $a$, $m$, $s$, and $p$ are as hereinabove defined) and crosslinking linkages crosslinking a plurality of the segments. Where the crosslinking agent is the aforementioned organic compound having a plurality of terminal alkoxy groups, the crosslinking linkages have the formula $R_{10}(CH_2)_b$ where $R_{10}$ and $b$ are as defined in Formula VIII. In the reaction of one equivalent of the amide-endcapped prepolymer with one equivalent of the crosslinking agent (represented by Formula VIII) there is eliminated 1 mole of alkanol having the general formula $$R_{11}OH \quad XV$$

where $R_{11}$ is as defined above in Formula VIII.

Representative free acids which can be used to catalyze the above-mentioned reaction between the crosslinking agent and the amide-endcapped prepolymer include any acid having a dissociation constant less than 4, such as mineral acids, e.g., hydrochloric acid, phosphoric acid, sulfuric acid, aromatic sulfonic acids, perfluorocarboxylic acids, and the like.

Where free acid addition is used to activate the crosslinking agent, generally from 0.1 to 10 weight percent, preferably 0.1 to 3 weight percent, based on the weight of the amide-endcapped prepolymer, will be sufficient, the rate of cure being dependent on the amount of free acid used.

Activation of the crosslinking agent with free acid generally results in a very rapid crosslinking reaction which may be difficult to control. Therefore, it may be desired to use a latent acid catalyst, i.e., a material which is normally non-acidic or non-catalytic, but becomes active or catalytic when activated by suitable means, e.g., heat, light, etc. Use of a latent acid catalyst (added as such or in a suitable solvent), provides for extended work or pot life (i.e., latency). Thus, after coating, molding, or application, the latent catalyst system can be activated to effect cure.

Where heat is used to activate, an especially useful class of latent acid catalyst is the amine salts of paratoluene sulfonic acid, especially the morpholine salt. Other heat-activated catalysts which can be used are the amine hydrochloride salts, and sulfate salts of brucine. The heat or thermally activated catalysts can generally be used at 50° to 150° C., preferably at 60° to 100° C., the particular temperature used depending on the particular catalyst used and cure rate desired, the cure rate also depending on the amount of latent catalyst used.

Light-activated latent acid catalyst can also be used to activate the crosslinking agents. Examples of such latent catalyst are halogenated hydrocarbons, such as $CBr_4$, $CHI_3$, $C_2H_2Br_4$, $C_2H_2Cl_4$, $C_2Br_6$, hexabromo-cyclohexane, phenethyl chloride or bromide, and tetrabromo-o-xylene, tribromoquinalidine, and 1,5-dihydroxy-2,2,4,4-tetrachloropentan-2-one, etc.

The wavelength of light used to activate these latent catalysts will depend upon the particular latent catalyst used.

Where actinic light is used to effect cure of the latently curable mixtures, actinic light of wavelengths from about 2,500 A. to about 7,000 A. can be used from such sources as sunlight, mercury arc, fluorescent light bulbs, etc. The preferred actinic light to be used in effecting the cure is ultraviolet light, the latter being photon energy or light of wavelengths less than 4,000 A., the lower limit of wavelength being determined by the transmission characteristics of the materials through which the light must pass. The lower limit is usually in the range of 1,800 to 2,000 A., although light of any wavelength between 1,800 and 4,000 A. can be used, wavelengths of 2,000 and 4000 A. being preferred. Irradiation sources high in ultraviolet output are preferred sources, and mercury vapor arc lamps, such as Ferro Allied 1,440 watt UV lamp, will be most useful because of the relatively intense radiation produced thereby. The length of time that the polymerizable or curable composition is exposed to actinic light, whether for the purpose of phototriggering or curing the composition, will vary and depend on the particular composition to be irradiated, as well as the light source used and the temperature. Sensitizers can be used in combination with such catalysts, the sensitizer being compounds which absorb light of longer wavelengths and transfer this energy to the latent catalysts. Thus, curing can be effected at wavelengths other than that absorbed by the latent catalyst.

The cured hydrophilic compositions of this invention can be used in areas where presently polymeric materials are used, such as protective or decorative coatings for substrates such as wood, concrete, and metal, for fibers for textile manufacture, and flexible and rigid foams, such as used in packaging, toys, etc. Additionally, the cured polymers of the present invention have application in special use situations requiring hydrophilic materials. For example, they may be used to form water swellable gaskets, semi-permeable membranes, and the like. The advantages of these compositions and in their preparation over the prior art polyurethanes, and the versatility of curing conditions and variations in pre- and post-cure properties, are combined with their relatively low cost, to provide a novel class of polymers.

EXAMPLES

The objects and advantages of this invention are further illustrated by the following examples, but it should be understood that the various materials and amounts thereof used in these examples, as well as conditions of reaction and other details, should not be construed to unduly limit this invention.

Example 1

One mole (1,000 g.) of a polyoxyethylene diol (Carbowax 1000), having a hydroxyl equivalent weight of 500, was dissolved in one liter benzene in a flask fitted with a stirrer, thermometer, nitrogen inlet and a condenser, protected by a drying tube. About 300 ml. of benzene was distilled from the solution to remove any residual water. The solution then was cooled to room temperature and the air in the flask was replaced with dry nitrogen and a nitrogen atmosphere was thereafter maintained. With rapid stirring, 365 g. (2.1 moles) of 2,4-tolylene diisocyanate was added in a single portion. Stirring at ambient temperature was continued overnight. Thereafter, the mixture was heated to reflux with stirring for about 2 hours. The benzene was removed by distillation under reduced pressure to give an isocyanato-terminated oxyethylene-containing prepolymer having an NCO equivalent weight of 674 as determined by residual isocyanate content.

In a flask fitted with thermometer, stirrer, nitrogen inlet, condenser and drying tube, was placed 337 g. (0.25 mole, 0.5 equivalent) of the above isocyanato-terminated prepolymer. Dichloromethane (400 ml.) was added and the mixture stirred under nitrogen to obtain a homogeneous solution. With rapid stirring, a solution of 65 g. (0.5 mole) of N-(2-hydroxyethyl)-imidazolidone in 250 ml. dichloromethane was added in a single portion. The exotherm which developed was controlled to 40° C. with external cooling. After the exotherm had abated, the mixture was heated to reflux overnight. The dichloromethane was removed by distillation under reduced pressure to give a thick, viscous liquid residue. Analysis by infrared indicated the product was the desired amide-terminated, oxyethylene-containing prepolymer. Calculations based on the experimentally determined isocyanate equivalent weight gave an amide NH equivalent weight of 804.

Example 2

Polyoxyethylene triol (355.5 g. 0.3 mole, 0.9 equivalent), prepared by condensing ethylene oxide with trimethylolpropane, was dissolved in 600 ml. benzene in a flask fitted with a stirrer, nitrogen inlet, thermometer, and condenser with drying tube. A 250 ml. portion of the benzene was distilled from the solution to remove residual water present. Using the same procedure as in Example 1, 165 g. (0.945 mole) of 2,4-tolylene diisocyanate was added and reacted. Determination of the residual isocyanate content of the isocyanate-terminated prepolymer after the reaction was complete gave an NCO equivalent weight of 569.

The isocyanate intermediate, prepared above (285 g., 0.5 equivalent) was dissolved in 350 ml. dichloromethane as in Example 1, and 65 g. (0.5 equivalent) of N-(2-hydroxyethyl)-imidazolidone in 250 ml. of dichloromethane was added. After the reaction and isolation, as in Example 1, an amide-terminated prepolymer was obtained which had a calculated amide NH equivalent weight of 699. The material was a clear, slightly colored, viscous liquid.

Example 3

A mixture of 16.1 g. (10 mmoles) of the amide-terminated prepolymer prepared in Example 1 and 7.8 g. (20 mmoles) hexamethoxymethylmelamine dissolved in 20 ml. methyl alcohol was prepared. Four drops of concentrated hydrochloric acid were added to the solution with stirring. The solution was coated (10 mils wet) on a polyester sheet (Mylar) and allowed to stand in air for about 30 minutes to permit solvent evaporation. Thereafter, the coating was cured by heating in an air oven at 100° C. for 30 minutes, and the Mylar film removed, giving a clear, colorless, flexible, self-supporting, cured film which when immersed in water absorbed at equilibrium an amount of water equal to 69 percent of its weight.

Example 4

A mixture of 21 g. (10 mmoles) of the amide-terminated prepolymer prepared in Example 2 and 7.8 g. (20 mmoles) hexamethoxymethylmelamine dissolved in 25 ml. methyl alcohol was prepared. A clear, flexible, colorless, self-supporting film was prepared by stirring 4 drops of concentrated hydrochloric acid into the mixture, coating, and drying as in Example 3. When immersed in water the cured film absorbed at equilibrium an amount of water equal to 38 percent of its weight.

Example 5

Polyoxyethylene triol (300 g., 0.5 mole, molecular weight 600), prepared by condensing ethylene oxide with trimethylolpropane was dissolved in 100 ml. dry tetrahydrofuran, and added dropwise over a three hour period to a stirred solution of 250 g. (2.5 moles) phosgene in 400 ml. of dry tetrahydrofuran. The mixture was heated at reflux in a stream of nitrogen to remove unreacted phosgene. The solvent was removed from the mixture when cooled, by distillation under reduced pressure to leave a polyoxyethylene trichloroformate as a colorless liquid having a molecular weight of 787.5.

The polyoxyethylene trichloroformate, 100 g. (0.1269 mole, 0.381 equiv.), prepared above was dissolved in 150 ml. chloroform and added dropwise to 300 ml. of a rapidly stirred saturated solution of ammonia in chloroform maintained at 0°C by an ice bath, and into which anhydrous ammonia was continuously bubbled. After complete addition of the chloroformate ester, the mixture was permitted to warm to room temperature while maintaining stirring. Thereafter, the mixture was heated to reflux for 1 hour to remove excess ammonia. Insoluble ammonium chloride formed during the reaction was removed by filtration. Volatile liquids were removed from the solution by distillation under reduced pressure to give a straw-colored liquid polyoxyethylene amide-terminated prepolymer having a molecular weight of 729.

Example 6

The polyoxyethylene amide-terminated prepolymer, 7.3 g. (10 mmoles, mol. wt. 729), prepared in Example 5 and 7.8 g. (20 mmoles) hexamethoxymethylmelamine were dissolved in 15 ml methyl alcohol. Four drops of concentrated hydrochloric acid were added to the solution with stirring, and the solution was coated and dried as in Example 3 to form a clear, colorless, self-supporting, rubbery film which absorbed and released water easily.

Example 7

Amide-terminated prepolymers were prepared according to the procedure described in Example 1 based upon polyoxyethylene diol (Carbowax 600) having an equivalent weight of 300, and based upon polyoxyethylene diol (Carbowax 1000) having an equivalent weight of 500 to give prepolymers with molecular weights of 1,208 and 1,608, respectively.

Films were prepared from each of the above-mentioned prepolymers by preparing an equal molar mixture of each prepolymer with hexamethoxymethylmelamine in methyl alcohol and acidifying with hydrochloric acid as described in Example 3. Each solution was coated on a glass plate, permitted to dry in air for 30 minutes, cured by heating at 100° C. for 60 minutes, and stripped from the plate as a self-supporting cured film.

Strips of each of the cured films were immersed into permanent blue-black ink (Sheaffer's Skrip No. 22) for about 30 seconds and then rinsed in distilled water and dried. Only a small amount of the pigment of the ink was absorbed by the film based on the polyoxyethylene diol having the lower equivalent weight (only slight coloring of the film was observed) whereas film based on the polyoxyethylene diol having the higher equivalent weight became intensely colored dark blue-black, dramatically demonstrating the molecular selectivity of the polymers. The relative amount of water absorption of the two films was also influenced by the equivalent weight of the diol. The water absorption amounted to about 35 weight percent for the polyoxyethylene diol based film of the lower equivalent weight and 74 weight percent for the film based upon the diol having the higher equivalent weight.

Example 8

Polyoxyethylene diol (Carbowax 600) reacted with hexamethylene diisocyanate was reacted with N-(2-hydroxyethyl)-imidazolidone according to the method described in Example 1 to produce an amide-terminated prepolymer having a molecular weight of 1,196. Several films were prepared by cross-linking the prepolymer in varying molar ratios with hexamethoxymethylmelamine. Films were prepared having molar ratios of prepolymer to hexamethoxymethylmelamine of 3 to 1, 3 to 2, 3 to 3, and 3 to 5. Samples of each film were immersed in the blue-black ink as described in Example 7. The film having the least relative amount of hexamethoxymethylmelamine absorbed the greatest amount of color from the ink while the film having the greatest relative amount of hexamethoxymethylmelamine was only slightly colored by the ink.

Example 9

Polyoxyethylene diol (Carbowax 1000) was reacted according to the procedure described in Example 3 to produce a polyoxyethylene amide-terminated prepolymer having a molecular weight of 1,086. The prepolymer (10.9 g., 10 mmoles) and 7.8 g. (20 mmoles) of hexamethoxymethylmelamine were dissolved in 20 ml. of 10 percent by volume acetone in water. Five drops of concentrated hydrochloric acid were added to the solution with stirring. After standing for 12 hours at room temperature in a closed flask, the mixture was observed to have formed a clear, colorless gel with excellent shape-retaining properties.

Example 10

Polyoxyethylene triol having a molecular weight of 1440 was reacted according to the procedure described in Example 3 to produce a polyoxyethylene amide-terminated prepolymer having a molecular weight of 1,569. The prepolymer (15.7 g., 10 mmoles) and 3.9 g. (10 mmoles) of hexamethoxymethylmelamine were dissolved in 10 ml. of acetone, and this solution was then diluted with 50 ml. of water. The solution was filtered through Whatman No. 1 filter paper and mixed with 15 drops of concentrated hydrochloric acid. After standing in a closed flask at room temperature for 60 hours, the solution was observed to be a colorless, optically clear, tough, flexible, elastic gel useful as a protective coating.

Example 11

A hydrophilic film, prepared according to the procedures described in Examples 2 and 4 from a prepolymer based upon a polyoxyethylene triol having a molecular weight of 1,500 and hexamethoxymethylmelamine in a molar ratio of 1 of the former to 2 of the latter, was immersed in distilled water for a period of time sufficient to allow equilibration. A 1.8 gram portion of the film, wiped free of surface droplets, was allowed to equilibrate while immersed in 10.0 ml of a 1.092N aqueous sodium chloride solution. Analysis of the solution after equilibration revealed a sodium chloride concentration of 1.012N, representing a concentration decrease of 4.7 mg. sodium chloride per ml.

Example 12

270 grams of polyoxyethylene diol (Carbowax 1000) was added with stirring to 100 grams of hexamethylene di-isocyanate in a dry nitrogen atmosphere to give a clear, straw colored solution. The solution was heated and stirred at 100° C for 6 hours and stirred at room temperature for an additional 6 hours causing a reaction which gave a viscous isocyanate-terminated oxyethylene-containing prepolymer having an isocyanate equivalent weight of 860 and which exhibited strong carbonyl bands indicating both urethane and isocyanate in its infrared spectrum.

To a solution consisting of 215 grams of the isocyanato prepolymer prepared above and 100 ml. chloroform, was added a solution consisting of 32.5 grams of N(2-hydroxyethyl)imidazolidone and 100 ml. chloroform. The combined solutions were refluxed at 72°C for 14 hours, whereafter the chloroform was removed by reduced pressure distillation leaving the desired amide-endcapped prepolymer as a hydrophilic gum. The amide endcapped prepolymer was soluble in acetone/water and in methanol/water solvents. Infrared analysis disclosed the gum to be devoid of an isocyanate band further indicating completion of the desired amide-forming reaction.

Example 13

Polyoxyethylene triol (395 g.), prepared by condensing ethylene oxide with trimethylpropane, was reacted under reflux for 4 hours with 224.5 g. 3-isocyanato-methyl-3,5,5-trimethylcyclohexyl isocyanate in 300 ml. methylene chloride containing 4 drops stannous octoate catalyst to produce an isocyanato-terminated prepolymer.

To the prepolymer solution prepared above was added 134 g. N(2-hydroxyethyl)imidazolidone in 100 ml. methylene chloride, and the mixture was allowed to reflux overnight. The methylene chloride was removed under reduced pressure to give a viscous amber-colored amide-endcapped prepolymer.

Example 14

A cross-linking composition was prepared as follows: In a dry nitrogen-flushed 2 liter flask fitted with a stirrer, dropping funnel, thermometer, trap, and nitrogen inlet was placed 1,190 parts hexamethoxymethylmelamine (Cymel-300). The flask was continuously flushed with dry nitrogen and heated to melt the hexamethoxymethylmelamine. Ethylene glycol (38 parts) and formic acid (12 parts) were added to the flask with stirring. Heating at 125°C and stirring were continued for 24 hours during which time about 36 parts methyl alcohol was distilled from the mixture and collected in the trap. The desired crosslinking composition obtained was a viscous liquid residue having an average molecular weight of 1,030.

Example 15

Ninety parts of the amide-terminated prepolymer prepared according to the method described in Example 13 was mixed with 10 parts of the crosslinking composition prepared according to Example 14 and dissolved in 30 parts of an acetone-methanol (4:1) solvent; 0.1 parts concentrated HCl was added and the solution coated (10 mils wet) on a releasable substrate (Mylar film) and allowed to dry by solvent evaporation for a few minutes. Thereafter the coating on the substrate was placed in an air oven and heated therein at 100° C. for 15 minutes. The coating was removed from the substrate and submersed into water until an equilibrium quantity of water had been imbibed. At equilibrium the film had imbibed about 50 percent by weight of water.

Example 16

Polyoxyethylene triol (molecular weight 1257, 275 grams) was reacted with 138 grams of 2,2,4-trimethylhexamethylene diisocyanate with stirring under nitrogen at 45°–50° C. for 14 hours to produce an isocyanato-terminated prepolymer. N-(2-hydroxyethyl)-imidazolidone (86 grams) dissolved in 200 ml. $CH_2Cl_2$ was then added to the isocyanato-terminated prepolymer and the mixture was refluxed with stirring for 12 hours, after which the solvent was removed under reduced pressure to leave the desired amide endcapped prepolymer as a clear, colorless viscous liquid residue.

The amide endcapped prepolymer was crosslinked according to the procedure set forth in Example 15 to produce a clear hydrophilic film.

Example 17

Polyoxyethylene triol (M.W. 1185, 790 parts) was combined in one portion with methylene diphenyl-4,4'-diisocyanate (M.W. 250, 503 parts) in 500 parts methylene chloride at room temperature with mixing for 24 hours, producing an isocyanato-terminated prepolymer in methylene chloride solution. The prepolymer solution was combined in one portion with a solution of N-(2-hydroxyethyl)-imidazolidone (M.W. 130, 263 parts) in 200 parts methylene chloride. The resultant combination was heated under reflux for 5 hours at 55°C whereafter infrared analysis revealed the absence of an absorption band at 4.45 microns (the absorption band corresponding to the —NCO group) indicating completion of the reaction to produce the desired amidetendcapped prepolymer.

Example 18

The amide terminated prepolymer prepared according to Example 17 (42 grams) was dissolved in 15 ml. acetone and the solution was mixed with 10 ml of an 80 percent aqueous solution of tetrakis(hydroxymethyl)phosphonium chloride. The mixture was coated at a 15 mil wet thickness on a releaseable surface (Mylar film) and cured in an air oven at 100°C for 1 hour resulting in a cured, transparent, rubbery, hydrophilic film.

Example 19

Ninety parts of the amide terminated prepolymer prepared according to Example 17 was dissolved in 25 parts acetone-water (4:1) to give a prepolymer solution. The prepolymer solution was combined with 10 parts paraformaldehyde. To this was added 0.1 parts concentrated HCl and the mixture was heated in a vessel at 100°C in an air oven for 30 minutes producing a water-insoluble hydrophilic elastomeric mass.

Example 20

A prepolymer solution such as prepared according to Example 19 was mixed with 5 parts paraldehyde and 0.1 parts concentrated HCl. The mixture was heated in a vessel at 100° C. in an air oven for 30 minutes producing a spongy water-insoluble hydrophilic mass.

Example 21

The amide-terminated prepolymer prepared according to Example 7 (13 grams) was blended with 6 grams water and 7 grams colloidal pyrogenic silica (Cab-O-Sil M-5) and the blend was heated at 60° C. for 6 days producing a tough, flexible, water-insoluble, organic solvent-insoluble, hydrophilic mass.

Example 22

To a stirred solution of terephthaloyl chloride (204 grams) in 200 ml. dichloromethane under a nitrogen atmosphere was added dropwise a solution consisting of a polyoxyethylene diol, molecular weight 608, (304 grams) and pyridine (80 grams) dissolved in 250 ml. dichloromethane. The rate of addition was adjusted such that the exotherm of the reaction caused gentle reflux. After complete addition, the mixture was stirred for an additional 2 hours, after which it was cooled in an ice bath and filtered to remove the precipitated pyridine hydrochloride. The solvent was then removed from the filtrate under reduced pressure to leave the diacyl chloride terminated prepolymer as an amber colored, low viscosity liquid. A 50 percent solution of the polyoxyethylene diacyl chloride in chloroform was then added dropwise to a stirred solution of an excess of anhydrous ammonia dissolved in cold chloroform; during the addition, gaseous ammonia was bubbled through the cold reaction mixture. After complete addition, the reaction mixture was allowed to warm to room temperature, and finally refluxed at 70°C to remove excess ammonia. The resultant mixture was filtered to remove precipitated ammonium chloride. Chloroform was removed from the filtrate under reduced pressure to leave the benzamide-terminated prepolymer as a viscous straw-colored liquid residue.

Example 23

A solution consisting of 15.5 grams of benzamide-terminated prepolymer as prepared in Example 22, 1.6 gram of the crosslinking agent as prepared in Example 14, 3 grams methanol, and 0.17 gram 85 percent orthophosphoric acid was coated on a glass substrate which was placed in an air oven at 100°C for 30 minutes. The coating cured to a water-insoluble, elastomeric, hydrophilic film which peeled easily from the glass substrate.

Example 24

The isocyanato-terminated prepolymer prepared according to Example 1 (55.5 grams) was mixed with a solution of 4.95 grams hydroxyurea in 100 ml of dimethylformamide in a vessel flushed with dry nitrogen. The mixture was stirred at 25°C for about 15 hours whereafter the mixture was submersed in 4 liters of ice water causing precipitation of the desired amide-terminated prepolymer which was separated from the solution by decanting the supernatant liquid. The amide-terminated prepolymer was purified by dissolving it in acetone and reprecipitating in ice water. After decanting the liquid and drying under reduced pressure the amide-terminated prepolymer remained as a light yellow viscous liquid residue.

Example 25

The amide-terminated prepolymer prepared according to Example 24 (90 parts) was mixed with 10 parts crosslinking agent prepared according to Example 14 dissolved in 15 parts acetone-methanol (4:1) to produce a solution. To this solution was added 1 percent (based upon the weight of the prepolymer) orthophosphoric acid. The resultant liquid was coated on a glass substrate and heated thereon in an air oven at 100°C for 1 hour producing a tough elastomeric, transparent, hydrophilic, water-insoluble film.

Example 26

Polyoxyethylene triol (molecular weight 1218, 24.4 grams) was mixed with 15.1 grams diphenylmethane-4,4'-diisocyanate in a dry nitrogen atmosphere for 12 hours to produce an isocyanato-terminated prepolymer. To this was added 6.30 grams of hydroxyethylcarbamate, and the mixture was thereafter stirred for 6 hours at room temperature producing the desired polyoxyethylene tricarbamate prepolymer. The resultant prepolymer was viscous liquid which was soluble in such solvents as acetone, tetrahydrofuran, and p-dioxane.

Example 27

The polyoxyethylene tricarbamate prepolymer prepared in Example 26 (80 parts) was mixed with 20 parts crosslinking agent prepared according to Example 14 and the mixture was dissolved in sufficient tetrahydrofuran/p-dioxane (1:4) to produce an 85 percent solids solution. Concentrated HCl (0.1 percent) was mixed into the solution which was thereafter coated on a glass substrate. The coated glass substrate was placed in an air oven at 110°C for 30 minutes producing a very tough, flexible hydrophilic film which stripped easily from the glass.

Example 28

Isocyanato-terminated prepolymer prepared according to Example 22 (200 parts) was added dropwise to a rapidly stirred solution of 20 parts ammonium hydroxide (specific gravity 0.90) in 150 parts water simultaneously dissolving and converting the isocyanate groups to the corresponding urea groups providing a polyoxyethylene diurea in water solution.

To 50 parts of the above prepared solution was added 20 parts aqueous formaldehyde (36 percent formaldehyde) and 3 parts concentrated hydrochloric acid causing the entire mixture to gel to a water-insoluble, flexible, hydrophilic mass which could be easily dehydrated and hydrated repeatedly.

The term "amide" as here used in describing the prepolymer end-capping group refers to the

radical however present, e.g., both with the carbon atom bonded directly to another carbon atom and also with the carbon atom bonded to an oxygen atom which is bonded to another carbon atom.

What is claimed is:

1. A process comprising mixing under anhydrous conditions an isocyanato- or a haloformyl-terminated hydrophilic polyoxyalkylene prepolymer, containing a plurality of oxyethylene units, with at least an equivalent amount of a compound having an amide functional group and at least one other functional group, each of said groups containing at least one replaceable hydrogen atom, at least one hydrogen atom of said other functional group being more reactive with said isocyanato or said haloformyl moieties than the replaceable hydrogen atoms of said amide group, thereby producing a hydrophilic amide-endcapped prepolymer, the compound having the amide group being selected from the group of compounds having the general formula $H-Q-(R_1)_n-R_2-H$ where Q is a divalent oxygen, a divalent sulfur, or $$-\underset{\underset{H}{|}}{\overset{R_3}{\underset{|}{N}}}-$$

where $R_3$ is hydrogen or an alkyl group having from one to six carbon atoms; $R_1$ is a divalent hydrocarbyl group;

$n$ is zero or 1; and when $n$ is zero, $R_2$ is a divalent radical having the formula

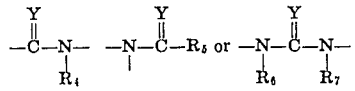

or when $n$ is 1, $R_2$ is a divalent radical having the formula $$-\overset{Y}{\underset{\underset{R_4}{|}}{\overset{\|}{C}}}-N- \quad -N-\overset{Y}{\overset{\|}{C}}-R_5 \quad -N-\overset{Y}{\overset{\|}{C}}-N- \text{ or } -O-\overset{Y}{\overset{\|}{C}}-N-\underset{R_8}{|}$$

where Y is divalent oxygen or sulfur, $R_4$, $R_5$, $R_6$, $R_7$, and $R_8$ are hydrogen, lower alkyl having from one to six carbon atoms, or phenyl, or $R_6$ and $R_7$ are joined to provide carbon atoms to form a four to seven member ring which includes the three members provided by the $$-\underset{|}{N}-\overset{Y}{\overset{\|}{C}}-\underset{|}{N}-$$

radical as shown, said amide having at least one replaceable hydrogen atom attached to Q that is reactive under the end-capping reaction conditions with the reactive isocyanato or haloformyl group of the prepolymer, and also having at least one replaceable hydrogen atom attached to $R_2$ that is non-reactive with said reactive isocyanato or haloformyl group.

2. The process according to claim 1 wherein said isocyanato-terminated prepolymer is a reaction product of (1) polyoxyalkylene polyol containing said plurality of oxyethylene units and having an average molecular weight of at least 149 and (2) an organic polyisocyanate.

3. The process according to claim 2 wherein said polyoxyalkylene polyol is polyoxyethylene polyol.

4. The process according to claim 1 wherein said haloformyl-terminated prepolymer is the reaction product of (1) polyoxyalkylene polyol containing said plurality of oxyethylene units and having an average molecular weight of at least 149, and (2) a polyacylhalide.

5. The process according to claim 4 wherein said polyacylhalide is phosgene or

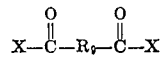

where $R_9$ is a divalent hydrocarbyl group extending between the carbon atoms of the carbonyl groups of the formula and X is a chlorine, bromine, or iodine atom.

6. The process according to claim 5 wherein said polyoxyalkylene polyol is polyoxyethylene polyol.

7. The process according to claim 1 further comprising mixing under acidic conditions said amide-endcapped hydrophilic prepolymer with a crosslinking agent to produce a crosslinked polymer.

8. The process according to claim 7 wherein said acidic conditions are derived by adding free acid or are obtained in situ by activating a latent acid catalyst with light, heat, or water.

9. The process according to claim 7 wherein said crosslinking agent is selected from a group consisting of aldehydes, polymers of aldehydes or alkoxy compounds having the general formula $$R_{10}(CH_2OR_{11})_b$$

where $R_{11}$ is an alkyl group, $b$ is an integer from two to 6, and $R_{10}$ is the polyvalent residue of an organic compound having a valency of $b$ and a general formula selected from the group consisting of (a) 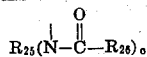

where $R_{25}$ is the polyvalent residue of an organic compound having a valence of $c$, $c$ is an integer from 2 to 4, and $R_{26}$ is hydrogen, alkyl, aryl, or alkoxymethyl;

(b) 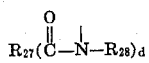

where $R_{27}$ is the polyvalent residue of an organic compound having the valency of $d$, $d$ is an integer from 2 to 4, and $R_{28}$ is hydrogen, alkyl, aryl, or alkoxymethyl;

(c) 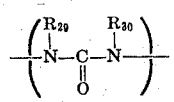

where $R_{29}$ and $R_{30}$ are hydrogen, alkyl, aryl, alkoxymethyl, or are joined by one to four carbon atoms in a chain to form a ring; or (d) 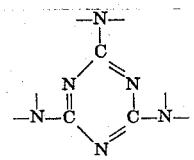

10. The process according to claim 9 wherein said crosslinking agent is hexamethoxymethylmelamine.

11. The process according to claim 9 wherein said crosslinking agent is a chemical condensation product of ethylene glycol and hexamethoxymethylmelamine, said product having a plurality of terminal methoxide groups.

12. A hydrophilic amide-endcapped prepolymer having the formula $$R_{14}[(R_{15}O)_m(R_{16})[Z-(R_{17})_s-R_{18}-H]_a]_p$$

where $R_{14}$ is the polyvalent residue of an organic compound having active hydrogens but devoid of such active hydrogens, $p$ is an integer from 2 to 6, $(R_{15}O)_m$ is a divalent hydrophilic polyoxyalkylene chain having a plurality of oxyethylene units, $m$ is an integer from 5 to about 200 representing the number of oxyalkylene units in said chain, $R_{16}$ is the polyvalent residue of a polyisocyanate or polyacylhalide compound having a valency of $a+1$, $a$ is an integer from 1 to 3, $R_{17}$ is a divalent hydrocarbyl selected from a group consisting of alkylene, oxyalkylene, arylene, and alkarylene, $s$ is zero or 1, Z is divalent oxygen, divalent sulfur, or an imino group having a hydrogen or lower alkyl substituent, $R_{18}$ is a radical having the formula

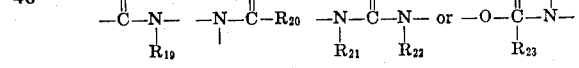

where $R_{19}$, $R_{20}$, $R_{21}$, $R_{22}$, $R_{23}$ are hydrogen, alkyl or aryl, $R_{21}$ and $R_{22}$ are separate radicals or are joined in a chain by from one to four carbon atoms to form a ring, and Y is oxygen or sulfur.

13. A process comprising mixing the hydrophilic amide-endcapped prepolymer of claim 12 with a crosslinking amount of a crosslinking agent under acidic conditions to produce a crosslinked hydrophilic polymer.

14. A composition comprising the prepolymer of claim 12 in admixture with a crosslinking amount of a crosslinking agent.

15. The composition according to claim 14 wherein said crosslinking agent has the general formula $$R_{10}(CH_2OR_{11})_b$$

where $R_{11}$ is an alkyl group, $b$ is an integer from 2 to 6, and $R_{10}$ is the polyvalent residue of an organic compound having a valency of $b$ and a general formula selected from he group consisting of (a) 

where $R_{25}$ is the polyvalent residue of an organic compound having a valence of $c$, $c$ is an integer from 2 to 4, and $R_{26}$ is hydrogen, alkyl, aryl, or alkoxymethyl;

(b) 

where $R_{27}$ is the polyvalent residue of an organic compound having the valency of $d$, $d$ is an integer from 2 to 4, and $R_{28}$ is hydrogen, alkyl, aryl, or alkoxymethyl;

(c) 

where $R_{29}$ and $R_{30}$ are hydrogen, lower alkyl having from one to six carbon atoms, aryl, alkoxymethyl, or are joined by one to four carbon atoms in a chain to form a ring; or (d) 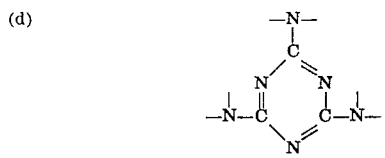

16. The composition according to claim 15 wherein said crosslinking agent is hexamethoxymethylmelamine.

17. The composition according to claim 15 wherein said crosslinking agent is a chemical condensation product of ethylene glycol and hexamethoxymethylmelamine, said product having a plurality of terminal methoxide groups.

18. A hydrophilic water-insoluble polymer comprising crosslinked hydrophilic polyoxyalkylene-containing segments having terminal amido groups, said segments being crosslinked by connection between nitrogen atoms of said amido groups.

19. A crosslinked hydrophilic polymer comprising crosslinked segments having the formula

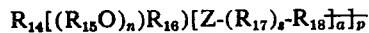

where $R_{14}$ is the polyvalent residue of an organic compound having active hydrogens but devoid of such active hydrogens, $p$ is an integer from 2 to 6, $(R_{15}O)_n$ is a divalent hydrophilic polyoxyalkylene chain having a plurality of oxyethylene units, $n$ is an integer from 5 to about 200 representing the number of oxyalkylene units in said chain, $R_{16}$ is the polyvalent residue of a polyisocyanate or a polyacylhalide compound having a valency of $a+1$, $a$ is an integer from 1 to 3, $R_{17}$ is a divalent hydrocarbyl selected from a group consisting of alkylene, oxyalkylene, arylene, and alkarylene, $s$ is zero or 1, Z is a divalent oxygen, divalent sulfur, or an imino group having a hydrogen or lower alkyl substituent, $R_{18}$ is a radical having the formula

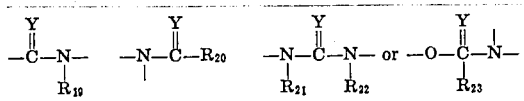

where $R_{19}$, $R_{20}$, $R_{21}$, $R_{22}$, $R_{23}$ are hydrogen, alkyl or aryl, $R_{21}$ and $R_{22}$ are separate radicals or are joined in a chain by from one to four carbon atoms to form a ring, and Y is oxygen or sulfur, and crosslinking linkages crosslinking a plurality of said segments.

* * * * *